United States Patent

Okamoto et al.

[11] Patent Number: 4,980,534
[45] Date of Patent: Dec. 25, 1990

[54] METHOD AND DEVICE FOR TREATING MACHINED SURFACE OF WORKPIECE

[75] Inventors: Masahiro Okamoto, Kariya; Yasuo Niino, Aichi, both of Japan

[73] Assignee: Toyoda Koki Kabushiki Kaisha, Kariya, Japan

[21] Appl. No.: 273,043

[22] Filed: Nov. 18, 1988

[51] Int. Cl.⁵ ............................................. B23K 26/00
[52] U.S. Cl. .......................... 219/121.6; 219/121.85; 219/121.82
[58] Field of Search ............ 219/121.6, 121.85, 121.65, 219/121.66, 121.82

[56] References Cited

U.S. PATENT DOCUMENTS

| 3,802,927 | 4/1974 | Gomada | 219/121.66 X |
| 3,848,104 | 11/1974 | Locke | 219/121.8 |
| 4,017,708 | 4/1977 | Engel et al. | 219/121.66 X |
| 4,316,074 | 2/1982 | Daly | 219/121.66 X |
| 4,365,136 | 12/1982 | Gottlieb | 219/121.65 |
| 4,429,210 | 1/1984 | Sudo et al. | 219/121.8 |
| 4,533,815 | 8/1985 | Ecer | 219/121.66 |

FOREIGN PATENT DOCUMENTS

| 131367 | 1/1985 | European Pat. Off. |
| 61-159293 | 7/1986 | Japan |
| 61-54085 | 11/1986 | Japan |
| 8200635 | 3/1982 | World Int. Prop. O. |

Primary Examiner—C. L. Albritton
Attorney, Agent, or Firm—Oblon, Spivak, McClelland, Maier & Neustadt

[57] ABSTRACT

In a method and a device for treating a machined surface of a workpiece made of a brittle material, a laser beam generated by a laser oscillator is applied to the machined surface of the workpiece while the workpiece is relatively moved with respect to the laser beam. Additiives and impurities exsisting in cracks generated on the machined surface melt due to thermal energy of the laser beam thereby to eliminate the cracks and improve the strength of the workpiece.

8 Claims, 5 Drawing Sheets

METHOD AND DEVICE FOR TREATING MACHINED SURFACE OF WORKPIECE

BACKGROUND OF THE INVENTION

1. Field of the Invention

The present invention relates to a method and a device for treating machined surfaces of workpieces made of brittle materials to eliminate cracks generated thereon.

2. Description of the Prior Art

In the case where a workpiece made of a brittle material such as ceramics is subjected to the machining work such as the grinding work, cracks are generated on the surface of the workpiece due to the machining work to lower the strength of the obtained workpiece.

For preventing the generation of the above-descrived cracks and increasing the strength of the workpiece, conventionally, fine machining work such as fine grinding work has been performed by decreasing the cutting depth of a grinding wheels, and/or by reducing the feeding speed of the workpieces during the grinding work, for example.

By this fine machining work, the number and depth of cracks can be reduced, but the generation of cracks cannot be completely prevented. Accordingly, the fine-machined workpiece is subjected to the lapping work. But, even after the workpieces are lapped by a lapping oil containing abrasive grains, the generated cracks are not completely eliminated thereby.

Moreover, the above-described fine machining work takes a long operation time.

Therefore, this fine machining work causes the increase in production cost and time, and does not serve to improve the strength of the machined workpiece.

SUMMARY OF THE INVENTION

It is an object of the present invention to provide a method and a device for speedily treating the machined surface of a workpiece made of a brittle material to obtain a workpiece of a high strengh, of which the machined surface is free from cracks, with good productivity.

In the method of the present invention, a laser beam is applied to the machined surface of the workpiece made of the brittle material for a predetermined time, and the laser beam is relatively moved with respect to the machined surface for heating the whole of the machined surface.

And the device of the present invention has laser generating means for generating laser, a lens member provided opposite to the machined surface for applying the generated laser to the machined surface as a laser beam, and moving means for relatively moving one of the lens member and the machined surface with respect to the other one.

According to the present invention, by virtue of the use of the laser beam, additives and impurities exsisting in the boundary between grains located near the machined surface melt due to thermal energy of the laser beam to fill up the cracks thereby to completely eliminate the cracks and improve the strength of the machined surface of the workpiece.

Moreover, according to the present invention, the conventionally performed fine-machining work and lapping work become unnecessary. This results in the production cost and time being decreased, and accordingly the productivity being greatly improved.

BRIEF EXPLANATION OF THE DRAWINGS

FIG. 3 is a top plan view of the first embodiment;

FIG. 4 is a graph showing the relation between the irradiation time of the laser beam and the bending strength of the workpiece in the first embodiment;

FIG. 5 is a top plan view of the second embodiment;

FIG. 6 is a cross-sectional view of the second embodiment, taken along the line VI—VI of FIG. 5;

DETAILED DESCRIPTION OF THE EMBODIMENT

Figure 1:
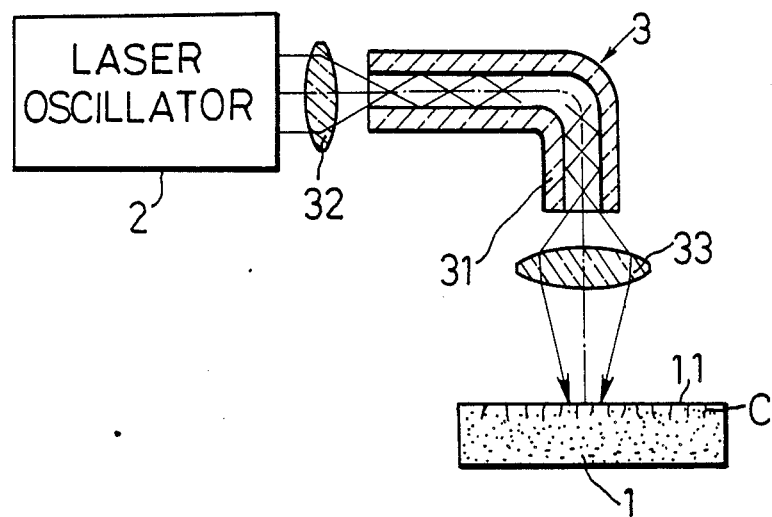
FIGS. 1 and 2 are schematic diagrams illustrating the basic technical idea of the present invention.
Figure 2:
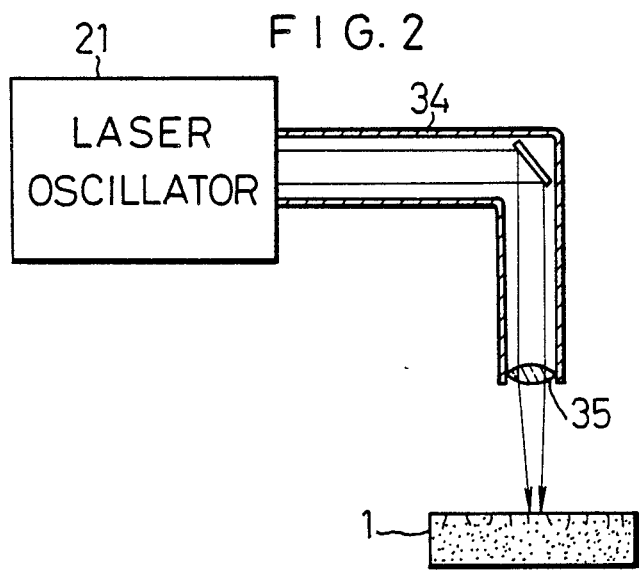

Hereinafter, the basic technical idea of the present invention will be explained with reference to FIGS. 1 and 2.

When a workpiece 1, which is made of a brittle material such as ceramics, is machined cracks C are generated on a machined surface 11 of the workpiece 1 to incur the lowering of the strength of the machined workpiece 1. According to the present invention, in order to eliminate these cracks, laser beam is applied to the machined surface 11 of the workpiece 1 from a laser oscillator 2 through an optical transmission medium 3.

In the case of the laser beam of a short wave length, such as YAG laser beam, an optical fiber 31 and two convex lenses 32, 33 respectively disposed at laser beam inlet end and outlet end of the optical fiber 31, serve as the optical transmission medium 3. The laser beam transmitted from the laser oscillator 2 is converged by the convex lens 32 and enters the optical fiber 31. After passing the optical fiber 31 while being repeatedly reflected on an inner surface of the optical fiber 31, the laser beam is converged again by the convex lens 33 and is applied to the machined surface 11 of the workpiece 1. The whole machined surface 11 of the workpiece 1 is irradiated with the laser beam by relatively moving the machined surface 11 with respect to the applied laser beam.

By applying the laser beam to the machined surface 11 of the workpiece 1, additives such as sintering aids and binders, and impurities each existing in the boundary between grains located near the machined surface the laser beam to fill up the cracks C thereby to completely eliminate the cracks C and recover the lowered strength of the workpiece 1.

In the case of the laser beam of a long wave length such as $CO_2$ gas laser beam, the laser beam generated by the laser oscillator 21 is transmitted within a guide tube 34 and is reflected by a mirror disposed at a bent portion of the guide tube 34. The reflected $CO_2$ gas laser beam is converged by a convex lens 35 disposed at an outlet end of the guide tube 34, and is applied to the machined workpiece 1 to eliminate the cracks generated on the machined surface thereof similarly to the case of YAG laser beam.

According to the present invention, any kind of laser other than the above-described YAG laser and $Co_2$ gas laser can be used.

Hereinafter, the present invention will be explained in accordance with several embodiments wherein the present invention is applied to workpieces which are subjected to the grinding work.

Figure 3:
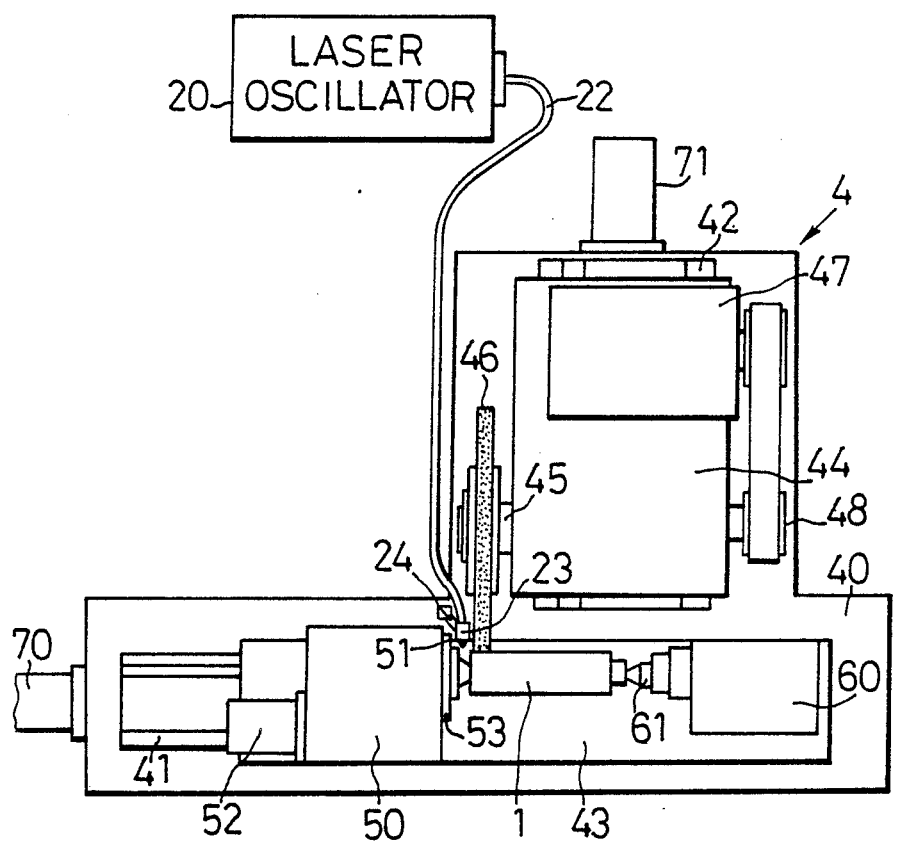
FIGS. 3 and 4 illustrate a first embodiment of a device for treating a machined surface of a workpiece made of a brittle material according to the present invention.

FIG. 3 illustrates a first embodiment of a device and a method for treating a machined surface of a workpiece of a brittle material according to the present invention, wherein laser beam is applied to a workpiece ground by means of an external cylindrical grinding machine.

A bed 40 of an external cylindrical grinding machine 4 is provided with a first slideway 41 and a second slideway 42. The first slideway 41 extends rightward and leftward in FIG. 3, and slidably mounts a table 43 while the second slideway 42 extends backward and frontward in FIG. 3, and slidably mounts a wheel head 44.

On the table 43 are oppositely disposed a headstock 50 and a tailstock 60. The headstock 50 rotatably supports a main spindle 51 which is to be driven by a motor 52. And a chuck 53 is attached to a tip end of the main spindle 51 while a center 61 is attached to the tailstock 60. A cylindrical workpiece 1 made of a brittle material such as fine ceramics is supported by the chuck 53 and the center 61.

The wheel head 44 rotatably supports a wheel spindle 45, and on a tip end of the wheel spindle 45 is detachably mounted a diamond grinding wheel 46. The wheel spindle 45 is driven by a motor 47 through a pulley 48.

The table 43 and the wheel head 44 are slid on the slideway 41 and 42 by means of servomotors 70 and 71 and ball-screw mechanisms (not shown), respectively.

The reference numeral 20 represents a YAG laser oscillator separately disposed from the bed 40. Laser beam transmitted from the laser oscillator 20 is guided to a laser torch 23 through an optical fiber 22. The laser torch 23 is attached to the bed 40 on a forward side of the grinding wheel 46 with respect to the grinding direction of the table 43 so as to be directed to an outer surface of the workpiece 1. In FIG. 3, the table 43 is slide leftward. So, the laser torch 23 is attached to the bed 40 near the main spindle 51 by a bracket 24. The laser torch 23 is provided with a convex lens(not shown) for converging the laser beam.

Next, the operation of the device of the first embodiment will be explained.

First, the table 43 is slid to its rightward sliding end and the wheel head 44 is slid to its backward sliding end. And in this state, the cylindrical workpiece 1 is supported by the chuck 53 and the center 61 on the table 43. Then, the motors 47 and 52 are operated to rotate the grinding wheel 46 and the main spindle 51, respectively.

Next, the wheel head 44 is slid forward until the grinding wheel 46 abuts on the outer surface of the workpiece 1, and the table 43 on which the workpiece 1 is mounted is repeatedly slid leftward and rightward while the wheel head 44 is slid forward for grinding, until the outer surface of the workpiece 1 becomes smooth. At the start of the leftward sliding of the table 43 for the final grinding, the laser oscillator 20 is started transmitting laser beam to the laser torch 23 by way of the optical fiber 22, and the workpiece 1 starts moving relatively with respect to the grinding wheel 46 and the adjacent laser torch 23. This results in the outer surface of the work piece 1 being ground, and then the ground outer surface of the workpiece being irradiated with laser beam.

After the whole outer surface of the workpiece 1 is irradiated with the laser beam, the wheel head 44 is slid backward, the table 43 is slid rightward, and the rotations of the grinding wheel 46 and the main spindle 1 are stopped.

Figure 4:
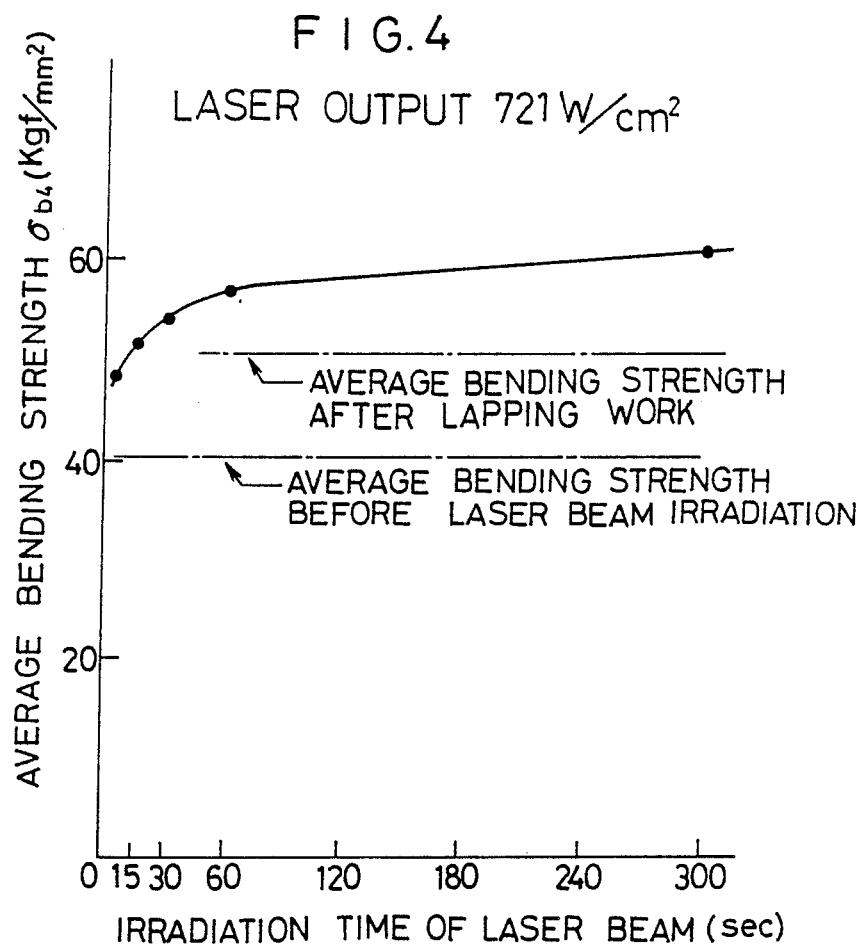

FIG. 4 is a graph showing the relation between the irradiation time of the laser beam and the bending strength of the workpiece in the case of a laser output of $721W/cm^2$.

As is apparent from FIG. 4, by applying the laser beam to the machined workpiece for a short time (15 sec.), the average bending strength thereof is increased as compared with the oases of the machined workpiece being not irradiated with the laser beam, and the machined workpiece being subjected to the lapping work. And as the irradiation time of the laser beam is extended, the average bending strength of the workpiece is much increased.

According to the device and the method of the above-described first embodiment, the cracks generated during the grinding work can be eliminated due to thermal energy of the laser beam. Therefore, the strength of the ground workpiece can be improved.

Moreover, according to the first embodiment, the final grinding process and the cracks-eliminating process can be effected at substantially the same time. Therefore, the production time can be greatly decreased.

In addition, according to the first embodiment, the grinding process and the cracks-eliminating process can be effected on a single machine tool. So, the production cost is also greatly decreased, accordingly, the productivity is remarkably improved.

In the first embodiment the laser torch is fixed to the bed through the bracket. Instead, if a cover is provided for the grinding wheel, the laser torch may be fixed to this cover.

The present embodiment is applied to the external grinding machine. In addition, the present embodiment can be applied to the other machine tools such as a lathe turning machine, too.

Figure 5:
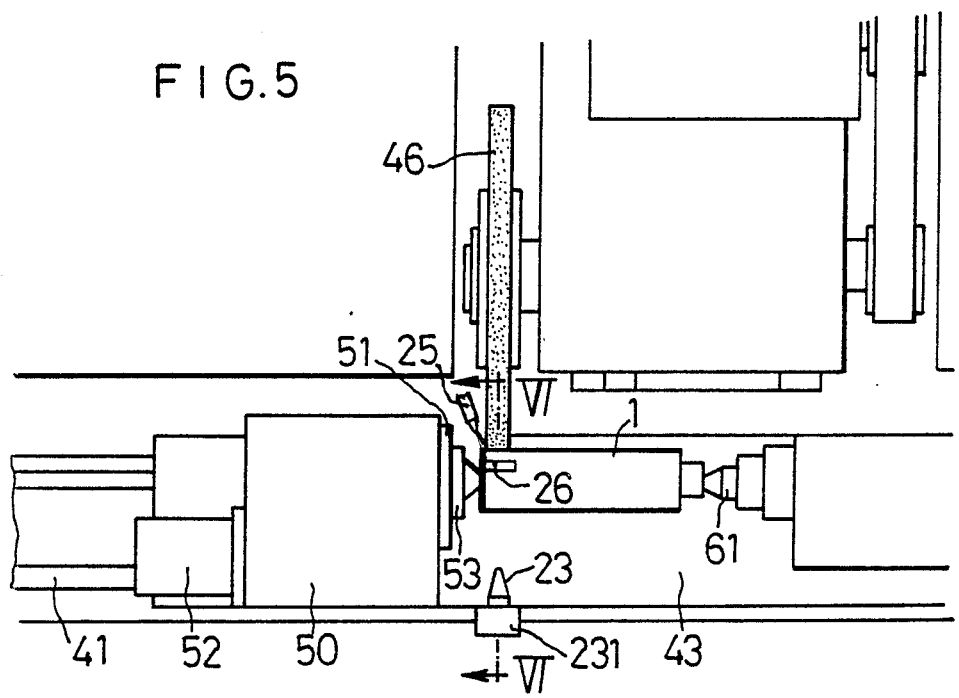
FIGS. 5 and 6 illustrate a second embodiment of the device according to the present invention.
Figure 6:
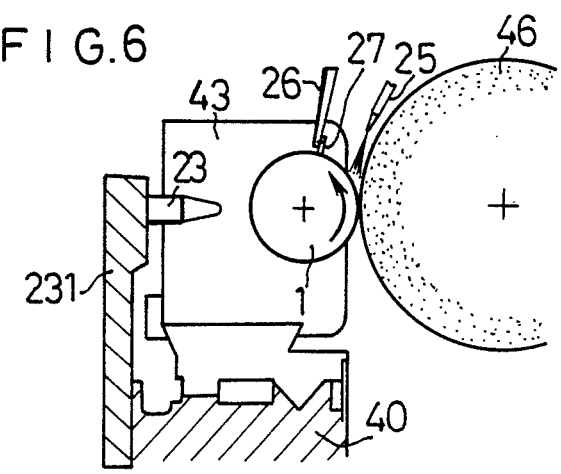

FIGS. 5 and 6 illustrate a second embodiment of the present invention, wherein the present invention is applied to the external cylindrical grinding machine, similarly to the first embodiment.

In FIGS. 5 and 6, the laser torch 23 is attached to an upper end of a bracket 231 projecting from the bed 40 so as to be directed to the frontside of the workpiece 1 opposite to the grinding wheel 46, and a coolant nozzle 25 is provided for injecting coolant toward the outer surface of the workpiece 1 to be ground by the grinding wheel 46.

And a coolant guard plate 26 secured to the headstock 50 is provided at an intermediate position between the grinding wheel 46 and the laser torch 23 along the outer surface of the workpiece 1. To a tip end of the guard plate 26 is fixed a scraper 27 made of rubber in watertight contact with the outer surface of the workpiece 1.

The other structure of the device of the second embodiment is substantially equal to that of the first embodiment.

In operation, in the second embodiment, while the workpiece 1 is rotated in a direction shown by an arrow in FIG. 6, and is ground by the grinding wheel 46, coolant is injected from the coolant nozzle 25 for cooling the ground surface of the workpiece 1 of which the temperature is excessively raised due to grinding. At this time, the coolant guard plate 26 prevents the coolant from flowing into the frontside of the workpiece 1. Therefore, the outer surface of the frontside of the workpiece 1 to be irradiated with laser beam transmitted from the laser torch 23 can be prevented from being cooled by the coolant. Accordingly, the irradiation of laser beam to the workpiece 1 can be effected at a high temperature, so the cracks-eliminating process can be effectively performed.

The other operation of the second embodiment is substantially equal to that of the first embodiment.

Figure 7:
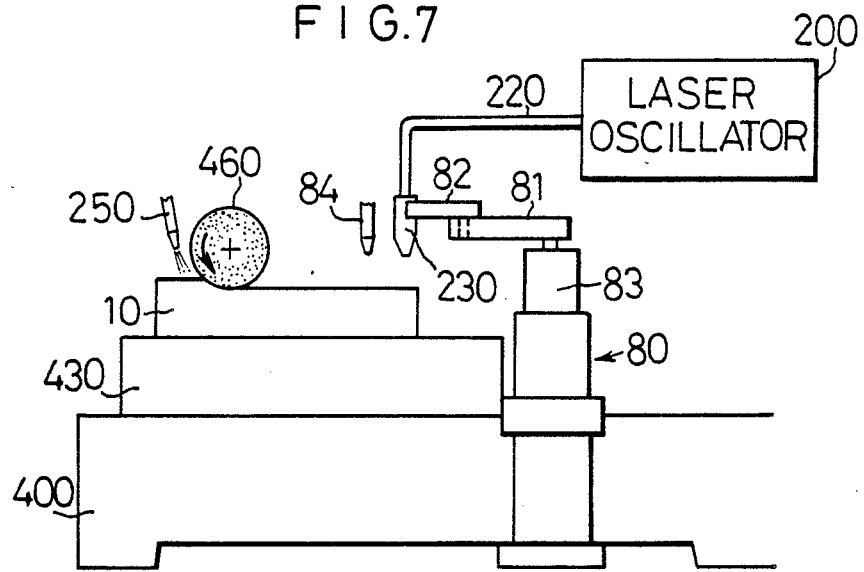
FIG. 7 is a front view of a third embodiment of the device according to the present invention.

FIG. 7 illustrates a third embodiment of the present invention wherein the present invention is applied to a surface grinding machine.

In FIG. 7, a table 430 is slidably supported by a bed 400, and a thick board-shaped workpiece 10 is mounted on the table 430, and is moved rightward and leftward with the table 430. A grinding wheel 460 is rotatably supported by a wheel head (not shown) so as to be moved downward and abut on the upper surface of the workpiece 10. And a coolant nozzle 250 is provided on the left side of the grinding wheel 460 so as to be directed to the upper surface of the workpiece 10 on which the grinding wheel abuts.

An industrial robot 80 is mounted on the bed 400. The robot 80 is provided with a first arm 81 which is rotatably supported by a main body 83 of the robot 80, and a second arm 82 which is hinged on a tip end of the first arm 81. And a laser torch 230 is attached to a tip end of the second arm 82 so as to be directed to the upper surface of the workpiece 1 moving on the bed 400 with the table 430. A laser oscillator 200 is connected to the laser torch 230 through an optical fiber 220. And an air blower 84 is provided between the grinding wheel 460 and the laser torch 230.

In operation, the workpiece 10 mounted on the table 430 is moved rightward and leftward on the bed 400 for grinding. The grinding wheel 460 is rotated in a direction shown by an arrow in FIG. 7 and grinds the upper surface of the workpiece 10 while moving downward. At this time, the coolant nozzle 250 injects coolant to the ground surface of the workpiece 10 for decreasing the temperature thereof. When the workpiece 10 is moved rightward for the final grinding, the first arm 81 and the second arm 82 of the robot 80 are rotated so that the laser torch 230 is moved in directions, each being perpendicular to the moving direction of the workpiece 10. This results in the laser beam being applied to the whole upper surface of the workpiece 10. Before the workpiece 10 is irradiated with the laser beam, the coolant remaining on the ground upper surface is blown away by means of the air blower 84.

Figure 8:
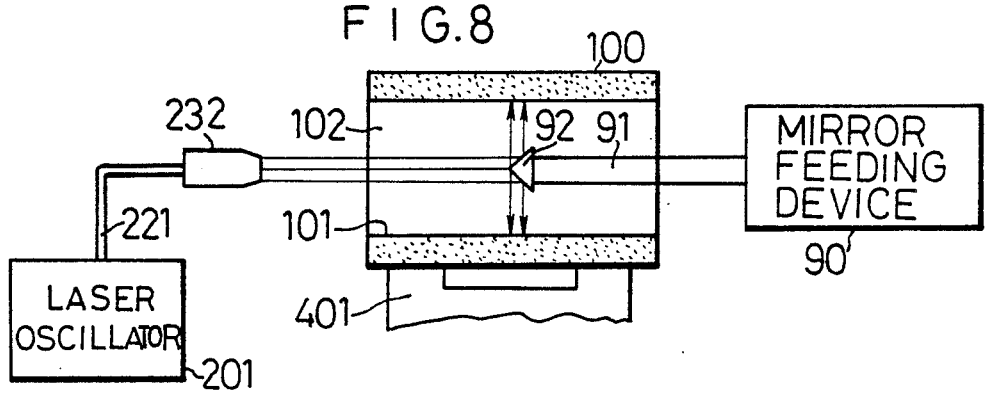
FIG. 8 is a partially sectioned schematic front view of a fourth embodiment of the device according to the present invention.

FIG. 8 illustrates a fourth embodiment of the present invention wherein the present invention is applied to an internally ground work piece.

The reference numeral 100 represents a cylindrical workpiece of which an inner surface 101 has been ground by an internal cylindrical grinding machine (not shown) or the like. The cylindrical workpiece 100 is mounted on a jig 401. A laser torch 232 is provided on an axis of the cylindrical work piece 100 outside of one open end thereof. The laser torch 232 ia connected to a laser oscillator 201 through an optical fiber 221. The reference numeral 90 represents a mirror feeding device which is provided outside of the other open end of the workpiece 100. A cone-shaped mirror 92 is attached to a tip end of a rod-shaped mirror feeding member 91. The mirror feeding member 91 is moved leftward and rightward in FIG. 8, on the axis of the workpiece 100 by means of a cylinder (not shown) or the like for feeding the cone-shaped mirror 92 into an inner bore 102 along the axis thereof from one open end to the other open end of the inner bore 102.

The laser beam is applied to the inner bore 102 of the workpiece 100 from the laser torch 232 while the cone-shaped mirror 92 is fed leftward and rightward within the inner bore 102 along the axis thereof by means of the mirror feeding member 91. The applied laser beam is reflected by the cone-shaped mirror 92 in directions, each being perpendicular to the axis of the cylindrical workpiece 100. And due to the movement of the mirror feeding member 91, the whole ground inner surface is irradiated with the laser beam from one end to the other end thereof.

According to the present embodiment, the inner surface of the cylindrical bore of the workpiece, having such a diameter that the laser torch cannot be provided in the bore so as to be directed to the inner surface thereof, can be irradiated with laser beam. By virtue of the cone-shaped mirror, an inner surface of a large area can be irradiatd with laser beam at a time.

The present embodiment is effected in an off-line system. The present embodiment can be also integrally provided on a single machine tool such as an internal griniding machine.

Moreover, in the present embodiment, the mirror feeding member is moved for irradiating the whole inner surface with laser beam. Instead, the workpiece may be axially moved while the cone shaped mirror is fixed.

What is claimed is:

1. A method for treating a machined surface of a workpiece made of brittle sintered material composed of small grains and having cracks in boundary areas between said grains, which have been produced in a previous machining process, comprising the steps of:
   applying a laser beam to a part of the machined surface so as to melt a substance in the boundary areas in the part of the machined surface, thereby cracks in the part of the machined surface are eliminated; and
   relatively moving said laser beam with respect to the machined surface thereby to eliminate cracks in the whole of the machined surface.

2. An apparatus for treating a surface of a workpiece made of brittle material, comprising:
   a bed;
   supporting means provided on said bed for supporting said workpiece;
   a tool relatively movably guided on said bed in order to be abutted on the surface of said workpiece;
   a laser torch provided on said bed for applying a laser beam to the surface of said workpiece;
   moving means for relatively moving said supporting means so as to machine the surface of said workpiece and to apply said laser beam to a machined part of the surface of said workpiece;
   wherein said workpiece has a cylindrical outer surface, said tool is guided to be movable in a direction perpendicular to the axis of said workpiece, said supporting means comprises rotating means for rotating said workpiece about its axis, said moving means axially moves said supporting means, and said laser torch is positioned close to a machining position by said tool; and wherein said supporting means comprises a table movable along the axis of said workpiece, a headstock mounted on said table and a tailstock mounted on said table, said workpiece being supported between said headstock and said tailstock.

3. An apparatus according to claim 2, wherein said tool is composed of a grinding wheel, a coolant nozzle for injected coolant toward the outer surface of said workpiece is provided, and a coolant eliminating mechanism for eliminating coolant remaining on the outer surface of said workpiece is provided between said grinding wheel and said laser torch.

4. An apparatus for treating a surface of a workpiece made of brittle material, comprising:

a bed;

supporting means provided on said bed for supporting said workpiece;

a tool relatively movably guided on said bed in order to be abutted on the surface of said workpiece;

a laser torch provided on said bed for applying a laser beam to the surface of said workpiece;

moving means for relatively moving said supporting means so as to machine the surface of said workpiece and to apply said laser beam to a machined part of the surface of said workpiece;

wherein said workpiece has a flat surface of a board shape, said tool is guided to be movable in a direction perpendicular to the surface of said workpiece, and said moving means linearly moves said supporting means and reciprocates said laser torch in directions intersecting with a moving direction of said supporting means;

wherein said supporting means comprises a table on which said workpiece is mounted and which is linearly moved along said bed, and an arm member for holding said laser torch is provided so as to reciprocate said laser torch in directions intersecting with a moving direction of said supporting means; and wherein said tool is composed of a grinding wheel, a coolant nozzle for injecting coolant toward the flat surface of said workpiece is provided, and a coolant eliminating mechanism for eliminating coolant remaining on the flat surface of said workpiece is provided between said grinding wheel and said laser torch.

5. A device for treating a machined outer surface of a cylindrical workpiece made of a brittle material and having a circular cross section, comprising:

laser generating means for generating laser;

a lens member for applying the generated laser to said outer surface of said cylindrical workpiece as a laser beam; and moving means for rotating and axially moving said cylindrical workpiece;

said moving means being composed of a main spindle and a tailstock of a machine tool, which are linearly fed along a bed and support both ends of said cylindrical workpiece, said lens member being internally provided in a laser torch which is mounted on said bed at such a position that said outer surface of said cylindrical workpiece machined by the machine tool passes.

6. A device according to claim 5, wherein a coolant eliminating mechanism for elimination coolant remaining on said outer surface of said cylindrical workpiece is provided between said tool and said laser torch.

7. A device for treating a machined flat surface of a board-shaped workpiece made of brittle material, comprising:

laser generating means for generating laser;

a lens member for applying the generated laser to said flat surface of said board-shaped workpiece as a laser beam; and moving means for linearly moving said board-shaped workpiece and reciprocating said lens member in directions intersecting with a moving direction of said board-shaped workpiece, opposite to said flat surface of said board-shaped workpiece;

said moving means being composed of a table of a machine tool on which said board-shaped workpiece is mounted and which is linearly moved along a bed, and an arm member which holds a laser torch internally provided with said lens member and reciprocates said laser torch in directions intersecting with a moving direction of said board-shaped workpiece at such a position that said flat surface of said board-shaped workpiece machine by the machine took passes;

wherein a coolant eliminating mechanism for eliminating coolant remaining on said flat surface of said board-shaped workpiece is provided between said tool and said laser torch.

8. A device for treating an outer surface of a cylindrical workpiece made of a brittle material and having a circular cross section, comprising;

laser generating means for generating laser;

a lens member for applying the generated laser to said outer surface of said cylindrical workpiece as a laser beam; and moving means for rotating and axially moving said cylindrical workpiece;

said moving means being composed of a main spindle and a tailstock, which are linearly fed along a bed and support both ends of said cylindrical workpiece, said lens member being internally provided in a laser torch which is mounted on said bed at such a position that said outer surface of said cylindrical workpiece passes.

* * * * *